United States Patent
Butterfield et al.

(10) Patent No.: US 10,216,763 B2
(45) Date of Patent: Feb. 26, 2019

(54) INTERESTINGNESS RANKING OF MEDIA OBJECTS

(75) Inventors: Daniel S. Butterfield, San Francisco, CA (US); Caterina Fake, San Francisco, CA (US); Callum James Henderson-Begg, San Francisco, CA (US); Serguei Mourachov, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 13/593,112

(22) Filed: Aug. 23, 2012

(65) Prior Publication Data

US 2012/0317110 A1 Dec. 13, 2012

Related U.S. Application Data

(63) Continuation of application No. 11/350,981, filed on Feb. 8, 2006, now Pat. No. 8,732,175.

(60) Provisional application No. 60/674,109, filed on Apr. 21, 2005.

(51) Int. Cl.
*G06F 17/30* (2006.01)

(52) U.S. Cl.
CPC .. *G06F 17/30265* (2013.01); *G06F 17/30011* (2013.01); *G06F 17/30864* (2013.01); *G06F 17/30997* (2013.01)

(58) Field of Classification Search
CPC ......... G06F 17/30038; G06F 17/30265; G06F 17/30268
USPC .................................. 707/748, 750
See application file for complete search history.

(56) References Cited

U.S. PATENT DOCUMENTS

| | | | |
|---|---|---|---|
| 5,642,502 A | 6/1997 | Driscoll | |
| 6,526,411 B1 | 2/2003 | Ward | |
| 6,615,039 B1 * | 9/2003 | Eldering | 455/418 |
| 6,757,661 B1 | 6/2004 | Blaser et al. | |
| 6,842,761 B2 | 1/2005 | Diamond et al. | |
| 6,944,611 B2 | 9/2005 | Flank et al. | |
| 6,977,679 B2 | 12/2005 | Tretter et al. | |
| 7,031,961 B2 | 4/2006 | Pitkow et al. | |
| 7,032,178 B1 | 4/2006 | McKnight et al. | |
| 7,068,309 B2 * | 6/2006 | Toyama et al. | 348/231.5 |

(Continued)

FOREIGN PATENT DOCUMENTS

| | | |
|---|---|---|
| EP | 1 324 227 | 7/2003 |
| JP | 10-028250 | 1/1998 |

(Continued)

OTHER PUBLICATIONS

HarBear et al., Combinatorics—weight function and coefficient Sep. 14, 2016, stackexchange.com, http://math.stackexchange.com/questions/1947334/combinatorics-weight-function-and-coefficient.*

(Continued)

*Primary Examiner* — Jason G Liao
(74) *Attorney, Agent, or Firm* — James J. DeCarlo; Greenberg Traurig, LLP

(57) ABSTRACT

Media objects, such as images or soundtracks, may be ranked according to a new class of metrics known as "interestingness." These rankings may be based at least in part on the quantity of user-entered metadata concerning the media object, the number of users who have assigned metadata to the media object, access patterns related to the media object, and/or a lapse of time related to the media object.

20 Claims, 4 Drawing Sheets

(56) References Cited

U.S. PATENT DOCUMENTS

| | | | |
|---|---|---|---|
| 7,072,863 B1* | 7/2006 | Phillips | G06Q 40/00 703/2 |
| 7,073,193 B2 | 7/2006 | Marsh | |
| 7,099,946 B2 | 8/2006 | Lennon et al. | |
| 7,149,755 B2 | 12/2006 | Obrador | |
| 7,181,438 B1 | 2/2007 | Szabo | |
| 7,220,910 B2 | 5/2007 | Plastina et al. | |
| 7,277,928 B2 | 10/2007 | Lennon | |
| 7,353,214 B2 | 4/2008 | Yamanishi et al. | |
| 7,440,948 B2 | 10/2008 | Trowbridge et al. | |
| 7,793,326 B2 | 9/2010 | McCoskey et al. | |
| 7,925,669 B2 | 4/2011 | Freeborg et al. | |
| 8,200,618 B2 | 6/2012 | Spivack et al. | |
| 2002/0016786 A1 | 2/2002 | Pitkow et al. | |
| 2002/0032772 A1* | 3/2002 | Olstad et al. | 709/224 |
| 2002/0065844 A1 | 5/2002 | Robinson et al. | |
| 2002/0069218 A1 | 6/2002 | Sull et al. | |
| 2002/0152267 A1 | 10/2002 | Lennon | |
| 2002/0194200 A1 | 12/2002 | Flank et al. | |
| 2003/0036848 A1* | 2/2003 | Sheha et al. | 701/209 |
| 2004/0044661 A1 | 3/2004 | Allen et al. | |
| 2004/0199657 A1 | 10/2004 | Eyal et al. | |
| 2004/0230572 A1 | 11/2004 | Omoigui | |
| 2004/0230676 A1 | 11/2004 | Spivack et al. | |
| 2004/0267725 A1 | 12/2004 | Hank | |
| 2005/0060741 A1 | 3/2005 | Tsuti et al. | |
| 2005/0085343 A1* | 4/2005 | Burrows | A61B 5/00 482/1 |
| 2005/0131866 A1 | 6/2005 | Badros et al. | |
| 2005/0165757 A1 | 7/2005 | Broder | |
| 2005/0288959 A1 | 12/2005 | Eraker et al. | |
| 2005/0289163 A1* | 12/2005 | Gordon et al. | 707/100 |
| 2006/0004732 A1 | 1/2006 | Odom | |
| 2006/0004914 A1* | 1/2006 | Kelly et al. | 709/219 |
| 2006/0059034 A1* | 3/2006 | Iannucci et al. | 705/10 |
| 2006/0116983 A1 | 6/2006 | Dettinger et al. | |
| 2006/0129907 A1 | 6/2006 | Volk et al. | |
| 2006/0136462 A1* | 6/2006 | Campos et al. | 707/102 |
| 2006/0184566 A1 | 8/2006 | Lo et al. | |
| 2006/0200490 A1 | 9/2006 | Abbiss | |
| 2006/0212900 A1* | 9/2006 | Ismail et al. | 725/34 |
| 2006/0218141 A1* | 9/2006 | Tuttle et al. | 707/5 |
| 2006/0224738 A1 | 10/2006 | McIntyre | |
| 2006/0235843 A1 | 10/2006 | Musgrove et al. | |
| 2006/0242139 A1 | 10/2006 | Butterfield et al. | |
| 2006/0242178 A1 | 10/2006 | Butterfield et al. | |
| 2007/0011155 A1 | 1/2007 | Sarkar | |
| 2007/0177586 A1 | 8/2007 | Eyal et al. | |
| 2007/0185858 A1 | 8/2007 | Lu et al. | |
| 2007/0186267 A1 | 8/2007 | Ohde et al. | |
| 2007/0208613 A1 | 9/2007 | Backer | |
| 2007/0239712 A1* | 10/2007 | Chen et al. | 707/6 |
| 2010/0057555 A1 | 3/2010 | Butterfield et al. | |
| 2012/0158720 A1* | 6/2012 | Luan et al. | 707/732 |

FOREIGN PATENT DOCUMENTS

| | | |
|---|---|---|
| JP | 10-254886 | 9/1998 |
| JP | 2000-187664 | 7/2000 |
| JP | 2002-236695 | 8/2002 |
| JP | 2003233624 | 8/2003 |
| JP | 2003256428 | 9/2003 |
| JP | 2004-193871 | 7/2004 |
| JP | 2005-073190 | 3/2005 |
| KR | 2001-80587 | 8/2001 |
| KR | 2001-100702 | 11/2001 |
| KR | 2002-84223 | 11/2002 |
| KR | 10-2004-0065260 | 7/2004 |
| WO | 01/25424 | 4/2001 |
| WO | WO 200153994 | 7/2001 |
| WO | 01/72042 | 9/2001 |
| WO | WO 200533978 | 4/2005 |
| WO | 06/116196 | 11/2006 |

OTHER PUBLICATIONS

Tmighty et al., "Normalize" values to sum 1 but keeping their weights Jan. 14, 2013, stackexchange.com, http://math.stackexchange.com/questions/278418/normalize-values-to-sum-1-but-keeping-their-weights.*

Yu et al., A Survey of Prediction Using Social Media Mar. 7, 2012, arXiv, arXiv:1203.1647, pp. 1-20.*

Choros et al., Block Map Techniques for the Usability Evaluation of a Website 09, International Conference on Computational Collective Intelligence 2009, 743-51.*

European Search Report issued in connection with European Patent Appln. No. 06751095.8 dated Feb. 3, 2011.

International Search Report and Written Opinion issued in connection with International Application No. PCT/US2006/015263 dated Aug. 30, 2007.

RandsInResponse.com, (Dec. 3, 2004); "A Del.icio.us Interview", located at: <http://www.randsinresponse.com/archives/2004/12/03/a_delicious_interview.html>, last visited on Dec. 19, 2006, 6 pgs.

Turnbull, (Dec. 15, 2003); "No Joshing—Fun, Useful Websites for Free", located at: <http://manchesteronline.co.uk/business/technology/s/75/75889_no_joshing_fun_u . . . >, last visited on Dec. 11, 2006, 4 pgs.

Wikipedia, (Nov. 27, 2006); "del.icio.us", located at <http://en.wikipedia.org/wiki/Del.icio.us>, last visited on Dec. 11, 2006, 3 pgs.

Official Action issued in connection with U.S. Appl. No. 11/350,635 dated Mar. 14, 2012.

Official Action issued in connection with U.S. Appl. No. 11/350,635 dated Oct. 27, 2011.

Official Action issued in connection with U.S. Appl. No. 11/350,635 dated Mar. 21, 2011.

Official Action issued in connection with U.S. Appl. No. 11/350,635 dated Jul. 19, 2010.

Official Action issued in connection with U.S. Appl. No. 11/350,635 dated Mar. 15, 2010.

Official Action issued in connection with U.S. Appl. No. 11/350,981 dated Nov. 29, 2012.

Official Action issued in connection with U.S. Appl. No. 11/350,981 dated Jul. 11, 2012.

Official Action issued in connection with U.S. Appl. No. 11/350,981 dated Feb. 15, 2012.

Official Action issued in connection with U.S. Appl. No. 11/350,981 dated Sep. 12, 2011.

Official Action issued in connection with U.S. Appl. No. 11/350,981 dated Apr. 12, 2011.

Official Action issued in connection with U.S. Appl. No. 11/350,981 dated Nov. 8, 2010.

Official Action issued in connection with U.S. Appl. No. 11/350,981 dated Jul. 20, 2010.

Official Action issued in connection with U.S. Appl. No. 11/350,981 dated Dec. 22, 2009.

Official Action issued in connection with U.S. Appl. No. 11/350,981 dated May 29, 2009.

Official Action issued in connection with U.S. Appl. No. 11/350,981 dated Mar. 13, 2009.

Official Action issued in connection with U.S. Appl. No. 11/350,981 dated Jan. 7, 2009.

Official Action issued in connection with U.S. Appl. No. 11/350,981 dated Aug. 18, 2008.

Official Action issued in connection with U.S. Appl. No. 11/350,981 dated Jan. 25, 2008.

Official Action issued in connection with U.S. Appl. No. 12/555,706 dated Mar. 26, 2012.

Official Action issued in connection with U.S. Appl. No. 12/555,706 dated Nov. 16, 2011.

* cited by examiner

INTERESTINGNESS RANKING OF MEDIA OBJECTS

CROSS-REFERENCE TO RELATED APPLICATIONS

This application claims the benefit of priority to U.S. Application No. 60/674,109, filed Apr. 21, 2005, and entitled "GENERATION AND USE OF METADATA FOR MEDIA OBJECTS," which is incorporated by reference in its entirety herein.

This application is a continuation of and claims the benefit of U.S. patent application Ser. No. 11/350,981, filed Feb. 8, 2006, which is hereby incorporated by reference in its entirety.

This application is related to U.S. application Ser. No. 11/350,635, entitled "MEDIA OBJECT METADATA ASSOCIATION AND RANKING," which is incorporated by reference in its entirety herein.

BACKGROUND OF THE INVENTION

1. Field of the Invention

The present invention generally relates to the organization and display of media objects, and, more particularly, to a new class of metrics for ranking media objects, such as images.

2. Description of the Related Art

Existing web sites allow users to comment upon or review media such as books or movies. However, conventional web sites are limited in the type of information concerning media objects that can be provided either directly by a user or indirectly through the user's actions, and the use of that information to generate search results.

Search results rely upon rankings of items to determine the most relevant items to be presented to the searcher. These rankings may be based upon criteria such as the number of times a particular item was "clicked on" or viewed by a user. It is desired to make available a wider variety of user-derived information concerning media objects, and to develop more relevant rankings for media objects based upon that information.

SUMMARY OF THE INVENTION

Embodiments of the invention may determine an interestingness rank for a media object based at least in part on the quantity of user-entered metadata concerning the media object, the number of users who have assigned metadata to the media object, an access pattern related to the media object, and/or a lapse of time related to the media object. The rank may also be based at least in part on the relevance of metadata to the media object.

The interestingness rank may also be "personalized" to a user. For example, the rank may be based at least in part on the identity of a requester of the rank of a media object. The "requester" may expressly request the rank, or take an action, through any access pattern, such as entering a search query, that results in presentation of the media object and computation of the interestingness rank, whether or not the rank itself is provided to the requester. In particular, the rank may be based at least in part upon the relationship between a poster of the media object and the requester of the rank. The apparatus for determining the interestingness rank may be located at a server, and each user may be associated with a corresponding client. Note that the requester of the rank of a media object need not necessarily be a user who enters metadata concerning the media object.

The personalized interestingness rank for a media object associated with a user may be based at least in part on the number of media objects commonly assigned the same type of metadata by the user and the requester of the rank. For example, the rank may be based at least in part on the number of media objects commonly tagged or designated as favorites by the user and the requester of the rank. The user may be associated with the media object by virtue of assigning metadata to the media object, or posting the media object, for example.

The interestingness rank may also be based at least in part on a location associated with the media object. Logic for ranking the media object may accept a request for ranking of the media object by a first user. The rank may be based at least in part on a location associated with a residence of the user associated with the media object, or a residence of a user having a predefined relationship with the first user. Note that for all the embodiments herein, unless otherwise apparent the user who requests (either explicitly or implicitly, as explained above) a ranking for a media object, or who posts the media object, need not necessarily be a user who enters metadata concerning the media object.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
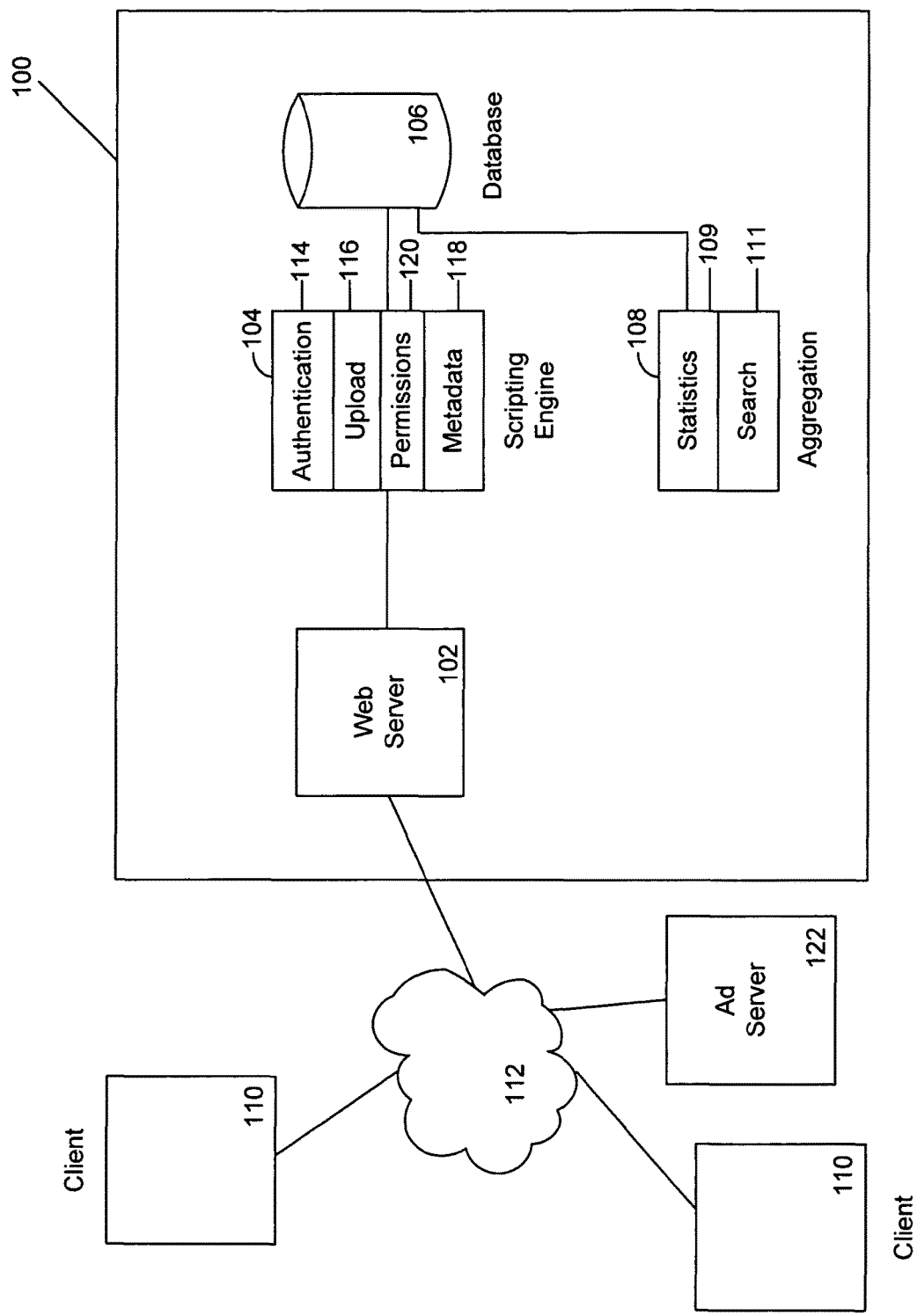
FIG. 1 illustrates a client-server system according to an embodiment of the present invention.

FIG. 1 illustrates a client-server system according to an embodiment of the present invention. A media server according to an embodiment of the invention may include http web server logic, a scripting engine (such as a PHP scripting engine), a database, and an aggregation engine. The media server may communicate with multiple clients over a network, such as the Internet.

The scripting engine may include authentication logic, upload logic, metadata processing logic, and permissions handling logic. The authentication logic authenticates a user signing on to the media server web site. The upload logic may be used to upload from the client to the server data conforming to any media format, e.g., still photograph (e.g., JPEG, TIFF), video (e.g., MPEG, AVI), or audio (e.g., MP3, OGG). The aggregation engine may include a statistics engine and a search engine. A client for use with the server of the invention may include a typical web browser application. Much of the functionality of the invention may be observed at www.flickr.com, which is incorporated by reference herein in its entirety.

According to an embodiment of the invention, a user at a client uses a browser to access the media server, and requests an upload of media objects. In response, the upload logic stores the media objects from the client into the database. For the sake of convenience, we will frequently use images as examples of media objects manipulated by the system, but those skilled in the art will recognize that the invention applies to other media objects, subject to appropriate modifications and use of other functions where appropriate (e.g., viewing a media object may apply to viewing a still or moving image or listening to an audio media object, such as a soundtrack).

Figure 2:
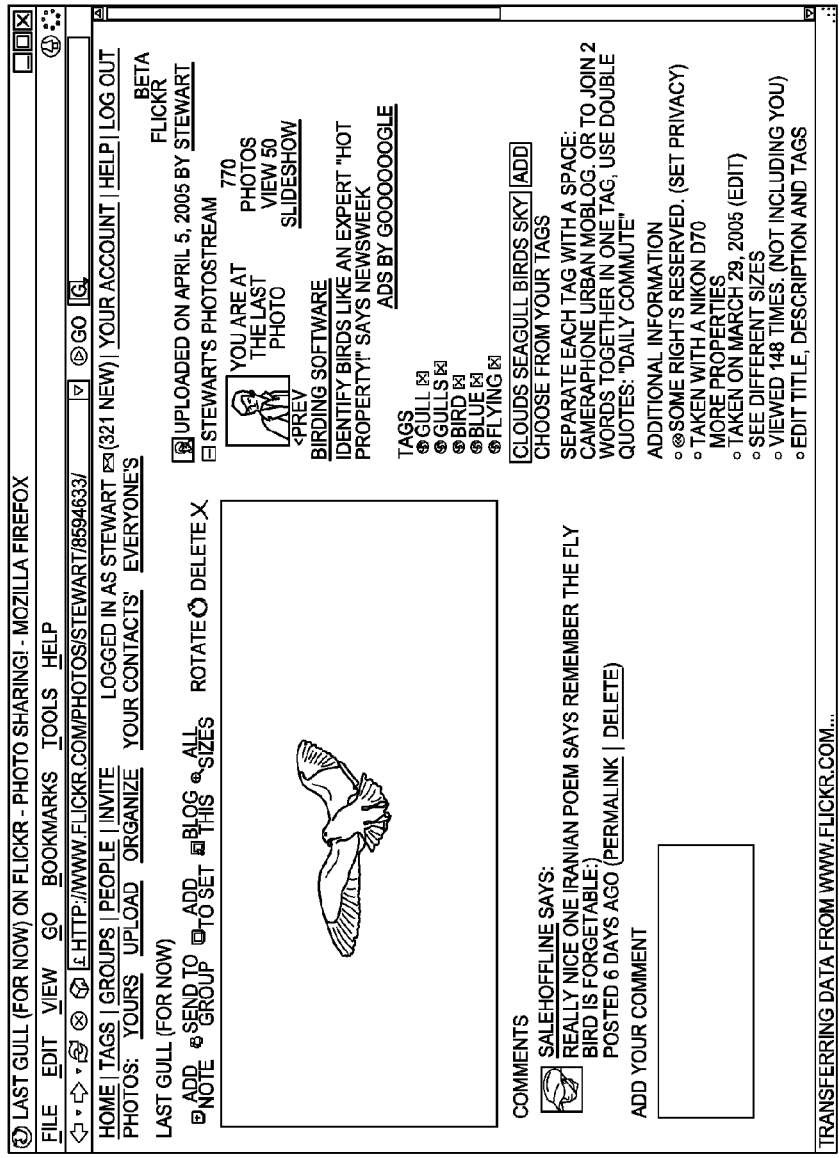
FIG. 2 is a screenshot illustrating the entry of tag metadata to a media object according to an embodiment of the present invention.
Figure 3:
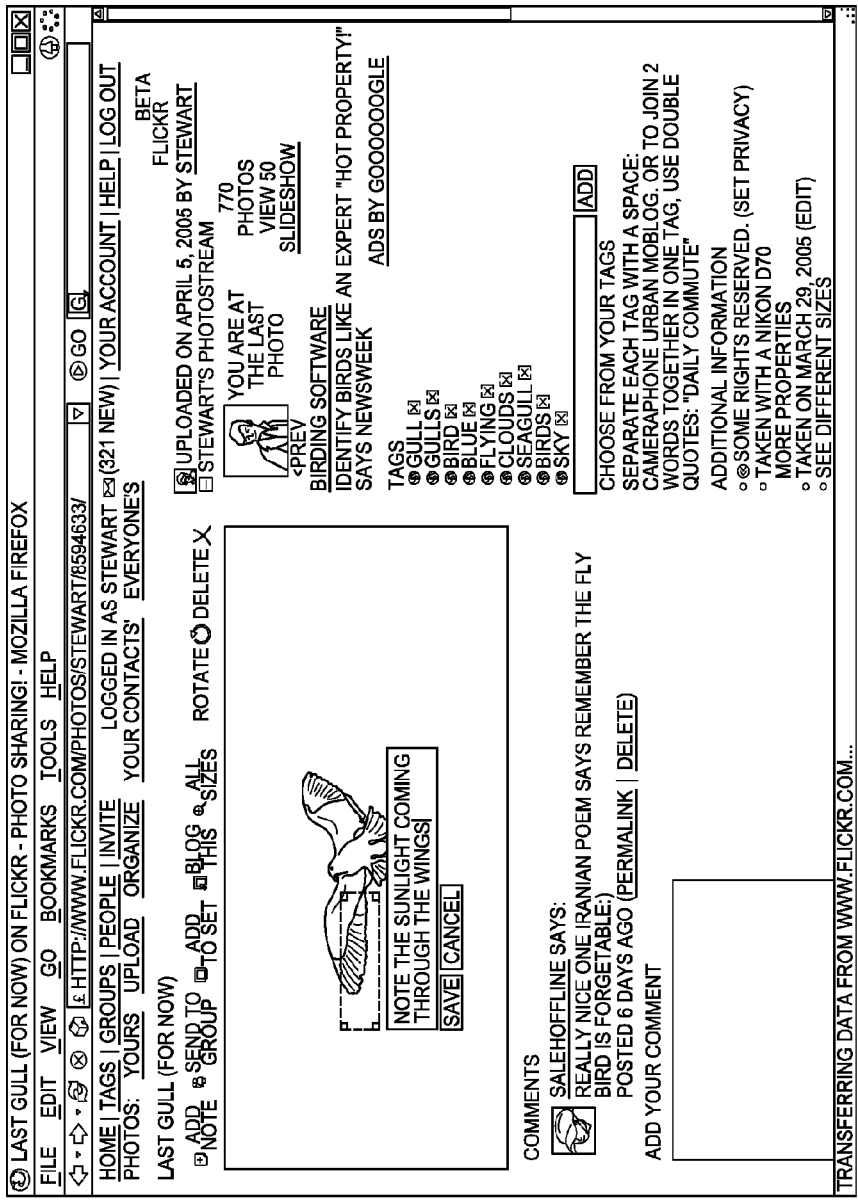
FIG. 3 illustrates adding annotation metadata according to an embodiment of the invention.

The metadata processing logic permits the user to enter metadata to describe each image. (As used herein, "metadata" may refer to one metadatum or plural metadata.) Referring to FIG. 2, the metadata may take the form of one or more tags for each image, such as four distinct tags entered as one space-delimited list "clouds seagull birds sky" for an image of a flying seagull. Other types of metadata include a title (e.g., "Last gull (for now)"), a description of the image, annotations, and comments. An annotation is a descriptive note displayed directly over a section of the image being annotated. The annotation may be hidden from view until the user passes a cursor over the annotated section. Referring to FIG. 3, for example, the user may add an annotation near the seagull's wing such as "Note the sunlight coming through the wings." A comment may be entered in a text input box similar to that used for entering comments on a message board. Multiple comments from any permitted user may be made and displayed for a media object.

Figure 4:
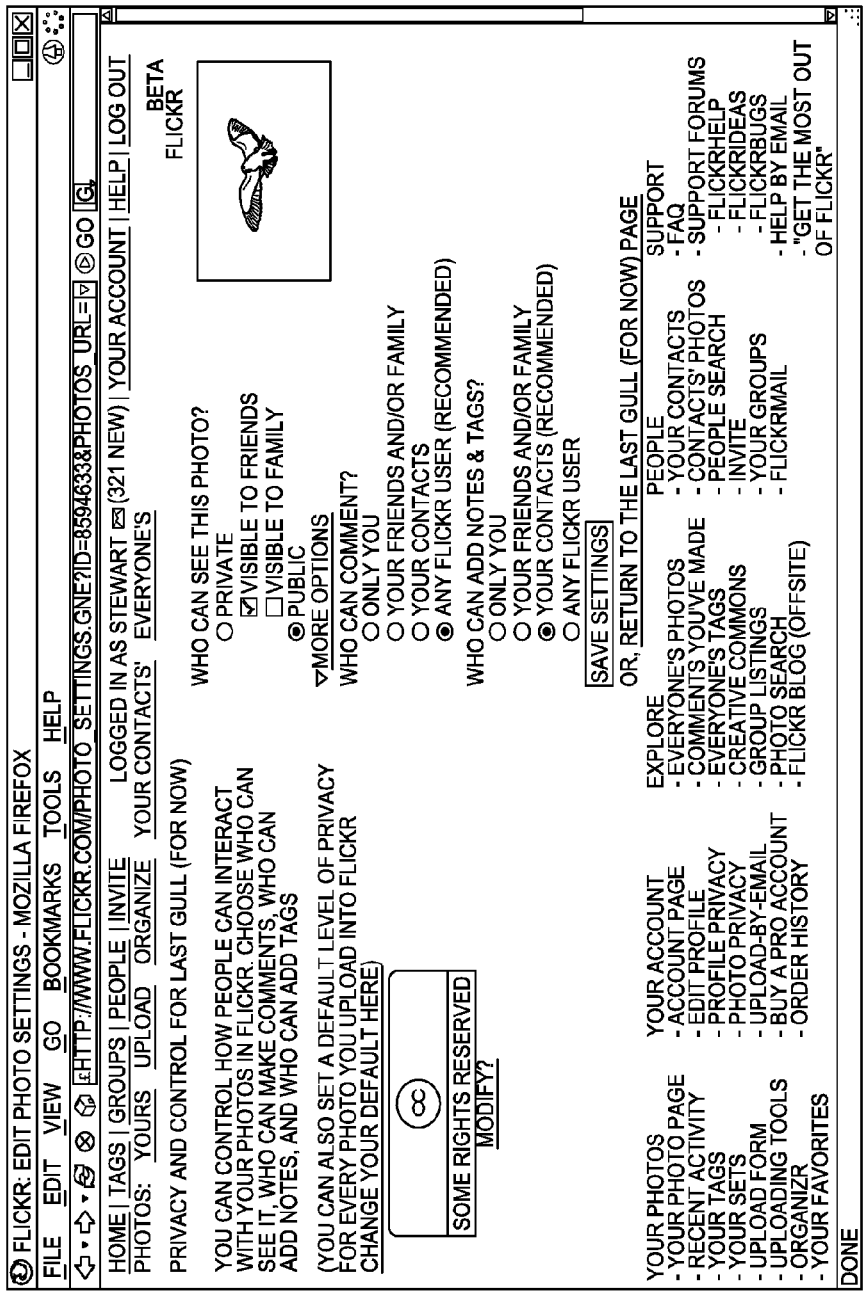
FIG. 4 illustrates setting permissions according to an embodiment of the invention.

Referring to FIG. 4, the permissions logic enables the user to set permissions concerning who is allowed to view each image. For example, the user may set the permissions to allow access only to the user herself, to a limited group of people, e.g., family and/or friends, or to the public (e.g., the entire user base). In addition, the permissions logic allows the user to permit others to provide metadata regarding each image. For example, the user may allow friends and/or family, any other user, someone from the user's contact list, or no one else, to add tags, comments (e.g., "I like the way the seagull is hovering"), or annotations.

The database enables organization of the media objects in a variety of ways. For example, a user's media objects may be organized chronologically, allowing the user to search media objects by date. This organization allows presentation of the media objects (e.g., photographic images, still images used to represent video files, or icons representing audio files) on the user's display along a timeline or in a calendar format (e.g., with a selected image from each day displayed at the corresponding date entry). The media objects may be displayed according to the date of upload, or the date that the media object was created, pursuant to the user's display format choice. Moreover, the scripting engine allows the display of the media objects in a slide show format.

For photographs, the date of creation may be based upon device-supplied metadata, such as metadata from the camera that took the picture, including metadata regarding aperture, shutter speed and other settings. Such metadata may be extracted, for example, from the EXIF (Exchangeable Image File) header stored inside the uploaded file by many digital cameras, or the IPTC (International Press Telecommunications Council) header stored inside the uploaded file by many photo management and organization software packages. The chronological organization of photographic images may be referred to as a "photostream."

The database also permits the user to organize media objects uploaded by the user into sets identified and described by user-provided set identifiers and descriptions. Each set of images, for example, is analogous to a photo album. Each media object may belong to multiple sets. The set identifier and description themselves are also metadata.

In contrast to a set, which includes media objects from just one user, media objects from multiple users may be pooled into a "group" using the database. Each group is identified by a group identifier provided by the user who establishes the group. The grouping of all groups together represents all the media objects of a particular type (e.g., images) accessible on the media server hosting the media objects. The group creator may set various permission levels for accessing and adding media objects to the group. The permission levels may include, for example, public for the entire user base, or private for friends/family or a user-defined social network. Users permitted access to a group may also be permitted to add tags, comments and/or annotations. Similar to the display and organization of an individual user's media objects, the database enables the organization and display of group media objects in a time line or calendar format arranged by date, as well as in slide show.

The media server may include an RSS feed generator to allow a user to subscribe to a "feed" of media objects, such as media objects belonging to a particular grouping, or identified by a particular tag, that are, for example, ordered by the date they were posted. (A "grouping" may refer to any collection, such as all groups of media objects, a single group of multiple users' media objects, all of an individual user's media objects, or a set (i.e., subset) of the individual's media objects.) An RSS reader at the user's client computer may be configured so that only new media objects posted since the user last accessed the media objects (e.g., updates) will be presented to the user. Similarly, the reader may be configured so that only the most recent of a string of comments relating to a particular media object may be displayed using this feature.

The statistics engine generates statistics and other metrics based upon aggregated metadata. In one embodiment, the statistics engine determines the popularity of metadata (e.g., tags) within a grouping of media objects over a predetermined time period. For example, the statistics engine may determine the number of different users that have assigned a particular tag to one or more media objects within all groups on the system, within a single group, or within a set of media objects, over the last 24 hours. The aggregation engine may determine (and display) a histogram of the tags, and may determine the most frequently assigned tags (at any point in time or over a predetermined time period) by determining those tags either having a frequency exceeding a minimum threshold frequency or belonging to a predetermined number of the most popular tags.

In one embodiment of the invention, a predetermined number of metadata (e.g., tags) or terms within metadata (e.g., terms within comments) may have their frequency indicated by the size of the font used to display them. For example, the 100 most popular tags within all groups may be arranged on a user's display alphabetically, with increasing popularity indicated by increasing font size.

In another embodiment, the statistics engine may determine the "relatedness" of metadata, i.e., a co-occurrence measure of the frequency with which a particular metadatum (e.g., tag) (or term within a metadatum (e.g., within a comment)) is assigned to a media object along with at least one other particular metadatum (or term within a metadatum). In one embodiment, the co-occurrence measure may determine the frequency of co-occurrence of metadata of the same type. For example, out of all 100 images tagged with the word "Italy," 50 of those images may also be tagged with "Rome," 25 tagged with "Venice," 10 with "Florence," and 2 with "Sienna." The co-occurrence index would respectively be 50 for "Italy-Rome," 25 for "Italy-Venice," 10 for "Italy-Florence," and 2 for "Italy-Sienna." In summary, include location as subset of tags, Tag MD can include location.

In another embodiment, the relatedness metric may be made user-specific, so that it is a co-occurrence measure of the frequency of the number of users who have (e.g., have uploaded, or have in their user account) at least one media object assigned a particular metadatum (e.g., tag) (or term within a metadatum (e.g., a comment)) along with at least one other particular metadatum (or term within a metadatum). For example, out of all 100 users that have at least one image tagged with the word "Italy," 50 of those users may have images tagged with "Italy" also tagged with "Rome," 25 also tagged with "Venice," 10 with "Florence," and 2 with "Sienna." The co-occurrence index would respectively be 50 for "Italy-Rome," 25 for "Italy-Venice," 10 for "Italy-Florence," and 2 for "Italy-Sienna."

A predefined number of the metadata (e.g., tags) having the highest co-occurrence indices, or those having co-occurrence indices exceeding a predefined threshold, may be displayed to the user as "related" metadata (e.g., tags), with at least one metadatum (e.g., tag) not satisfying the predefined condition being displayed under "See also." The predefined threshold may be computed as a percentage of the maximum possible value of the index. All such displayed metadata may act as hyperlinks to all media objects assigned the designated metadata. The relatedness measure may be applied to all "public" media objects (i.e., those available to anyone on the system), or to smaller groupings (such as those within a group or set).

As part of the relatedness computation, the statistics engine may employ a statistical clustering analysis known in the art to determine the statistical proximity between metadata (e.g., tags), and to group the metadata and associated media objects according to corresponding cluster. For example, out of 10,000 images tagged with the word "Vancouver," one statistical cluster within a threshold proximity level may include images also tagged with "Canada" and "British Columbia." Another statistical cluster within the threshold proximity may instead be tagged with "Washington" and "space needle" along with "Vancouver." Clustering analysis allows the statistics engine to associate "Vancouver" with both the "Vancouver-Canada" cluster and the "Vancouver-Washington" cluster. The media server may provide for display to the user the two sets of related tags to indicate they belong to different clusters corresponding to different subject matter areas, for example.

An embodiment of the invention permits a user to determine the relevance of a tag to a media object, in particular to media objects posted by other users. Relevance-setting icons or other input graphics may be displayed next to each tag. For example, the icons may include "+" and "−" buttons to indicate whether the user believes that the tag is relevant or not relevant, respectively, to the displayed media object. The statistics engine may collect the relevance entries for each media object to determine a relevance metric for the object. For example, the metric may simply be the number of entered "+"s divided by the total number of relevance entries for each media object. The statistics engine associates each vote with the voting user to prevent "stuffing the ballot box," i.e., the statistics engine avoids counting multiple votes by a single user concerning the relevance of a tag to a media object.

The statistics engine may factor the relevance value into the clustering analysis to affect the relatedness metric. For example, a tag that has a low relevance value would be treated as less related to other tags associated with the same media objects (i.e., weighted to have a longer statistical distance).

The metadata processing logic 118 may compute an "interestingness" metric for each media object, according to an embodiment of the invention. Interestingness may be a function of user actions related to a media object, including, for example, the quantity of user-entered and/or user-edited metadata and/or access patterns for the media objects. Alternatively or in addition to those factors, interestingness may be a function of time, system settings, and/or the relationship of the user to the poster of the media object.

Each of the above factors may be clipped by a maximum value set by the system designer, which is one way of weighting each factor. Alternatively, or in addition, before any clipping, each factor may be more directly weighted by a weighting coefficient that multiplies the factor. In either case, the factors (whether weighted or not) may be summed together to create an interestingness score (i.e., rank). The weighting and clipping may, of course, be applied at a finer level to each parameter (described below) contributing to any of these factors.

The interestingness score may be computed for any media object for any grouping, e.g., from all groups containing the media object, from one group containing the media object, from the area of the web site associated with the poster of the media object, or from within a set of that user's media objects containing the media object being scored, for example.

The quantity of user-entered metadata may include, for example, parameters such as the number of tags, comments and/or annotations assigned to the media object, and/or the number of users who have added the media object to their favorites/bookmarks. (Adding an audio media object to a user's favorites may include adding the media object to a user's playlist.) Alternatively or in addition to those parameters, the quantity of user-entered metadata may be user-related and include, for example, the number of users who have added tags, comments and/or annotations to the media object, and/or added the media object to their favorites/bookmarks.

Alternatively or in addition to those parameters, the metadata processing logic 118 may factor into the interestingness score access patterns for the media object, such as the number of viewings (or playbacks) and/or click throughs of the media object, and/or the number of users who have viewed (or played back), and/or clicked through the media object or tags related to the media object. Whether the interestingness algorithm treats a user's action as a "click through," or, conversely, a "view" or "viewing" of a media object may depend upon the route the user took to access the media object, i.e., the access pattern. For example, a search for images assigned a particular tag may return multiple thumbnail images. The algorithm may treat a user's clicking on a particular one of those thumbnails as a "click through."

In contrast, for example, an image emailed to a user from another user may be considered to be "viewed" by the user. In another example, when a user accesses a group pool of images, the user's browser may present the images as thumbnails. The user may click on a thumbnail to "view" it. Thus, it can be seen that the identical action of clicking on a thumbnail image may be treated as a "view" or a "click through" depending upon the path the user took to reach the image, i.e., the access pattern. Based upon psychological insights, marketing research or other factors, the system designer may want to treat certain access patterns as indicating a higher degree of user interest than others, and assign such access patterns a higher weight in computing the interestingness score. As perhaps a more illustrative example, if a user reaches and clicks upon a thumbnail image based upon paying $10.00 to access the image, then the system designer is likely to assign such an access path a higher weighting coefficient than a free access of an image. Conversely, certain sources of traffic, search terms, tag queries or other precursors to the display of thumbnail images may be determined to correlate with a motivation that is inconsistent with a high interestingness, and thus the system designer is likely to assign such access paths relatively low weighting coefficients.

In addition, the metadata processing logic 118 may factor into the score the relationship of the poster of the media object to the user (e.g., a user entering a search query). A user may be a member of a private group (e.g., friends and family, an interest group, or a social network) allowed access to the poster's media objects, or a user listed in the poster's contact list, for example. Given the potentially higher likelihood of a similarity of interests between such a user and the poster relative to other users, this relationship may be weighted and summed into the interestingness score to increase it.

The above functionality is an example of "personalization" of the interestingness score. In general, the score may be based upon the identity of the requester of the interestingness score for the media object. (As used herein, reference to the "requester" or to one who requests an interestingness score or rank of a media object refers to one who explicitly requests the score, or who takes an action through any access pattern, such as entering a search query, that results in presentation of the media object along with computation of the interestingness score by the metadata processing logic 118, whether or not the score itself is provided to the requester.) In particular, the score may be based upon the relationship between the poster of the media object and a user requesting the score.

In another embodiment, the personalized score for a media object associated with a user may be based upon the number of media objects assigned the same type of metadata (e.g., tags or favorites) by that user and the score requester. The media object may be associated with the user by, for example, being assigned metadata by a user or posted by the user. For example, assume that a first user and a second user store in their on-line albums 100 and 200 photo images, respectively. The second user may search for images associated with a particular tag. The search engine 111 may return an image stored in the first user's album. The metadata processing logic 118 may assign to that image a score as an increasing function of the number of other images in the first and second users' albums that have been commonly designated as favorites or commonly tagged by the first and second users, under the theory that such shared behavior serves as a predictor that the second user may be especially interested in images in the first user's album that the second user has not yet "favorited" or tagged.

In another embodiment, the metadata processing logic 118 may compute the interestingness score based upon a location associated with the media object and with a user requesting a score for the media object. For example, the metadata processing logic 118 may indicate that a media object is more interesting to a particular user if the location associated with the media object is associated with a residence of the user (e.g., near or in the same geographic region as the user's residence), associated with a residence of another user having a predefined relationship with the user, such as a friend or family member, or associated with a location that is itself associated with a threshold number of media objects that have been assigned metadata (e.g., tagged or favorited) by the user.

In the latter case, for example, the metadata processing logic 118 may, for a particular user, positively factor into the interestingness score of an image of the Washington Monument the fact that the user has designated as favorites a large number of images associated with the Washington, D.C. area. This assumes that location metadata indicating the Washington area has been associated with the image of the Monument, e.g., by the poster of the image or another user entering the location through a tag field or separate "location" field when assigning metadata to the image.

Other interestingness score components may be set by the system designer. For example, some media objects may be treated as undesirable because they contain objectionable content such as obscene imagery or promotions of a competitor's product. The system designer may, for example, set up the score computation to decrement the thus-far accumulated score by a predetermined score offset percentage assigned to a media object having a tag or other metadata on a "blacklist." Because a media object may be associated with more than one blacklisted tag, the score offset value may be chosen to be the greatest score offset associated with those tags.

Another score component may take time into account. For example, the system designer may set up the score computation to decrement the thus-far accumulated score by a predetermined percentage over time starting at the time the media object was posted. For example, this time decay may cause the score to decrement by 2% per day from the day of posting. This and other means may be employed to prevent the occurrence of "positive feedback loops" where the sorting of media objects by interestingness itself skews the results, causing those same media objects to be more frequently accessed, thereby unnaturally increasing their interestingness scores.

The ultimate interestingness score may be normalized, so that, for example, the interestingness score always falls between 0 and 100, or 0 and 1. One way of achieving normalization is to divide the actual score value by the maximum possible score value.

The search engine 111 allows the user to search media objects in the database according to various metadata. For example, a user may conduct a boolean search of tags among all media objects accessible to the user. Alternatively, the user may perform a full-text boolean search of terms in comments, annotations, titles or descriptions. The media objects accessible to a user include, for example, public media objects, media objects within a group, media objects for which the user is a friend/family member or member of another private group, all media objects posted by the user, or the user's media objects within a user-defined set.

The media objects returned from a search may be ranked according to interestingness. For example, the media server may, in one embodiment, provide for display to the searching user only the media objects having an interestingness score above a predetermined threshold, or a predetermined number of the highest scoring media objects.

In response to a search by tag, for example, the statistics engine 109 may determine the tags (or other metadata) that are most highly related to the one or more tags (or other metadata) in the search query (according to the relatedness metric). The media server 100 may return to the user at a client the most highly related tags (or other metadata) along with the retrieved media objects. If the relatedness computation results in two clusters of related tags (or other metadata), then media objects associated with the two clusters may be ranked (and displayed) in order of interestingness.

In an advertising context, advertisements may be associated with their own metadata/keywords, such as "Rome Italy hotels tourism travel" for an Italian hotel advertisement. Based upon those related keywords, an ad server 122 may use the relatedness metric and set of related tags or other metadata provided by the media server via the web server 102 to determine which advertisements sponsoring the web site are associated with predefined metadata/keywords that most closely match the set of related tags. (The ad server may be a third-party server on the network 112.) The ad server may provide to the user for display the most closely matching advertisements. For example, the ad server may provide for display at the user's client computer the ad for Italian hotels in conjunction with the display of pictures from the media server having a set of highly related tags "Rome Italy honeymoon." In this manner, the ad server uses the relatedness metric and set of highly related tags to provide the advertisements most highly related to the displayed media objects.

In another embodiment, in response to a search by tag (or other metadatum), the statistics engine may also prevent a media object assigned a tag (or other metadatum) that has a relevance score falling below a relevance threshold from being returned as a search result.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising:
   a processor;
   a memory;
   logic stored on said memory and executed by said processor for detecting a user interaction with a posted media object posted on a website by a posting user, the media object comprising metadata assigned to the media object;
   logic stored on said memory and executed by said processor for identifying a source of the interaction, the source comprising one of a search results page, a group pool of media objects, or an email message;
   logic stored on said memory and executed by said processor for classifying the user interaction based on the access pattern, the classifying comprising:
      classifying a type of the access pattern as a view if the source is identified as a group pool of media objects and the user interaction is a click of the posted media object,
      classifying a type of the access pattern as a click through if the source is identified as a click of the posted media object displayed on a search results page, and
      classifying a type of the access pattern as a view if the source is an email message;
   logic stored on said memory and executed by said processor for selecting an access pattern weight based on the type of the access pattern and a plurality of metadata weights based on the type of metadata assigned to the media object, wherein the access pattern weight and each of the metadata weights comprise predefined numerical coefficients;
   logic stored on said memory and executed by said processor for scoring the media object with an interestingness score, the scoring based in part on the access pattern weight, the metadata weights, and a relationship between the posting user and the user accessing the posted media object; and
   logic stored on said memory and executed by said processor for retrieving a plurality of responsive images in response to a search query, the responsive images including the media object;
   logic stored on said memory and executed by said processor for removing the media object from the responsive images if the interestingness score is below a pre-determined threshold; and
   logic stored on said memory and executed by said processor for causing display of the media object on the website if the interestingness score is above the pre-determined threshold.

2. The apparatus of claim 1, wherein the logic for scoring the media object further comprises logic for determining a relationship between the posting user and an accessing user.

3. The apparatus of claim 2, further comprising logic for increasing the score associated with the media object based on an identified similarity of interests between the accessing user and the posting user.

4. The apparatus of claim 1, wherein the scoring of the media object is based upon the identity of an accessing user.

5. The apparatus of claim 1, wherein the user interaction is a number of viewings of the media object.

6. The apparatus of claim 1, wherein the user interaction is a number of click throughs of the media object.

7. The apparatus of claim 1, wherein the user interaction is entering a search query.

8. The apparatus of claim 1, further comprising logic for determining a location associated with an accessing user.

9. The apparatus of claim 8, further comprising logic for determining a location associated with another user having a predefined relationship with the accessing user.

10. The apparatus of claim 1, further comprising logic for decrementing the score over time.

11. A method comprising:
 detecting, by a computing device, a user interaction with a posted media object posted on a website by a posting user, the media object comprising metadata assigned to the media object;
 identifying, by the computing device, a source of the interaction, the source comprising one of a search results page, a group pool of media objects, or an email message;
 classifying, by the computing device, the user interaction based on the access pattern, the classifying comprising:
  classifying a type of the access pattern as a view if the source is identified as a group pool of media objects and the user interaction is a click of the posted media object,
  classifying a type of the access pattern as a click through if the source is identified as a selection of the posted media object displayed on a search results page, and
  classifying a type of the access pattern as a view if the source is an email message;
 selecting, by the computing device, an access pattern weight based on the type of the access pattern and a plurality of metadata weights based on the type of metadata assigned to the media object, wherein the access pattern weight and each of the metadata weights comprise predefined numerical coefficients;
 scoring, by the computing device, the media object with an interestingness score, the scoring based in part on the access pattern weight, the metadata weights, and a relationship between the posting user and a user of the plurality of users accessing the posted media object, and the relationship between the location associated with the media object; and
 retrieving, by the computing device, a plurality of responsive images in response to a search query, the responsive images including the media object;
 removing, by the computing device, the media object from the responsive images if the interestingness score is below a pre-determined threshold; and
 causing, by the computing device, display of the media object on the website to be adjusted based on the interestingness score if the interestingness score is above the pre-determined threshold.

12. The method of claim 11, wherein the scoring of the media object further comprises determining a relationship between the posting user and an accessing user.

13. The method of claim 12, further comprising increasing the score associated with the media object based on an identified similarity of interests between the accessing user and the posting user.

14. The method of claim 11, wherein the scoring of the media object is based upon the identity of an accessing user.

15. The method of claim 11, wherein the user interaction is a number of viewings of the media object.

16. The method of claim 11, wherein the user interaction is a number of click throughs of the media object.

17. The method of claim 11, wherein the user interaction is entering a search query.

18. The method of claim 11, further comprising determining a location associated with an accessing user.

19. The method of claim 18, further comprising determining a location associated with another user having a predefined relationship with the accessing user.

20. The method of claim 11, further comprising decrementing the score over time.

* * * * *